US008971310B2

(12) United States Patent
Gutierrez et al.

(10) Patent No.: US 8,971,310 B2
(45) Date of Patent: Mar. 3, 2015

(54) APPARATUS AND METHOD FOR END-TO-END ADAPTIVE FRAME PACKING AND REDUNDANCY IN A HETEROGENEOUS NETWORK ENVIRONMENT

(75) Inventors: Alberto Gutierrez, Buffalo Grove, IL (US); Sunil H. Madhani, Austin, TX (US); Samarth H. Shah, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 2323 days.

(21) Appl. No.: 11/461,317

(22) Filed: Jul. 31, 2006

(65) Prior Publication Data

US 2008/0037521 A1 Feb. 14, 2008

(51) Int. Cl.
| | |
|---|---|
| *H04L 12/66* | (2006.01) |
| *H04L 1/00* | (2006.01) |
| *H04L 12/26* | (2006.01) |
| *H04L 12/18* | (2006.01) |
| *H04L 1/16* | (2006.01) |
| *H04W 24/08* | (2009.01) |

(52) U.S. Cl.
CPC .............. *H04L 12/66* (2013.01); *H04L 1/0001* (2013.01); *H04L 1/0007* (2013.01); *H04L 43/08* (2013.01); *H04L 12/1868* (2013.01); *H04L 1/16* (2013.01); *H04L 43/04* (2013.01); *H04W 24/08* (2013.01); *H04L 43/00* (2013.01); *H04L 43/0852* (2013.01); *H04L 43/0847* (2013.01); *H04L 43/0823* (2013.01)
USPC ........ 370/352; 370/229; 370/230; 370/230.1; 370/235; 370/252; 370/245; 370/392; 370/474

(58) Field of Classification Search
CPC ... H04L 12/4633; H04L 12/46; H04L 65/607; H04L 65/602; H04L 65/608; H04L 29/0653; H04L 65/60; H04L 65/601; H04L 69/22; H04L 65/80; H04L 12/66; H04L 1/0001–1/0007; H04L 43/00–43/0876; H04W 28/18; H04W 28/22; H04W 40/12; H04W 52/60; H04W 52/54; H04W 4/06; H04W 72/0446
USPC .............. 370/352–356, 229, 230, 230.1, 235, 370/245, 252, 392, 474
See application file for complete search history.

(56) References Cited

U.S. PATENT DOCUMENTS

| | | | | |
|---|---|---|---|---|
| 6,675,340 | B1 * | 1/2004 | Hardie et al. .................. | 714/751 |
| 7,017,102 | B1 * | 3/2006 | Kristensson et al. .......... | 714/786 |
| 2003/0018480 | A1 * | 1/2003 | Mecayten ...................... | 704/277 |
| 2003/0179744 | A1 * | 9/2003 | Grass ............................. | 370/352 |
| 2003/0193950 | A1 * | 10/2003 | Philips et al. .................. | 370/392 |

(Continued)

*Primary Examiner* — Asad Nawaz
*Assistant Examiner* — Najeebuddin Ansari
(74) *Attorney, Agent, or Firm* — Lerner, David, Littenberg, Krumholz & Mentlik, LLP

(57) ABSTRACT

A mobile station having a Voice-Over-Internet-Protocol client sends a message proposing a frame packing and frame repeating parameter set (1001). The called client may either accept the proposal or offer a revision (1003). If accepted the VoIP call is established (1009). If a revised proposal is received, it is determined whether the parameters are acceptable (1005). If not the call is declined (1007). If acceptable the call may proceed (1011). Both clients may then monitor network conditions (1013) and propose revisions to the parameters as conditions change. In this way, the VoIP application layer compensates for physical and Medium Access Control (MAC) layer inefficiencies in transporting the small frames used for audio data transfer for VoIP.

6 Claims, 8 Drawing Sheets

(56) References Cited

U.S. PATENT DOCUMENTS

| | | | |
|---|---|---|---|
| 2005/0054363 A1* | 3/2005 | Marinov et al. | 455/522 |
| 2005/0220014 A1* | 10/2005 | DelRegno et al. | 370/230 |
| 2006/0193286 A1* | 8/2006 | Naghian et al. | 370/328 |
| 2007/0036228 A1* | 2/2007 | Tseng | 375/245 |

* cited by examiner

FIG. 6

| | NETWORK TYPE | | | 1 | | 2 | | 3 | | 4 | | 5 | | 6 | | 7 | | 8 | | 9 | | 10 | | 11 | |
|---|---|---|---|---|---|---|---|---|---|---|---|---|---|---|---|---|---|---|---|---|---|---|---|---|---|
| | NETWORK TYPE | Np | Nr | Np | Nr | Np | Nr | Np | Nr | Np | Nr | Np | Nr | Np | Nr | Np | Nr | Np | Nr | Np | Nr | Np | Nr | Np | Nr |
| 1 | GPRS wo HC | 6 | 1 | 6 | 1 | 6 | 1 | 6 | 1 | 6 | 1 | 6 | 1 | 6 | 1 | 6 | 1 | 6 | 1 | 6 | 1 | 6 | 1 | 6 | 1 |
| 2 | GPRS w HC | 2 | 1 | | | 2 | 1 | 6 | 1 | 2 | 1 | 2 | 1 | 2 | 1 | 2 | 1 | 3 | 1 | 2 | 1 | 3 | 1 | 6 | 1 |
| 3 | CDMA 1X wo HC | 6 | 1 | | | | | 6 | 1 | 6 | 1 | 6 | 1 | 6 | 1 | 6 | 1 | 6 | 1 | 6 | 1 | 6 | 1 | 6 | 1 |
| 4 | CDMA 1X w HC | 2 | 1 | | | | | | | 2 | 1 | 2 | 1 | 2 | 1 | 2 | 1 | 3 | 1 | 2 | 1 | 3 | 1 | 6 | 1 |
| 5 | EDGE | 2 | 1 | | | | | | | | | 2 | 1 | 2 | 1 | 2 | 1 | 3 | 1 | 2 | 1 | 3 | 1 | 6 | 1 |
| 6 | HSDPA | 1 | 1 | | | | | | | | | | | 1 | 1 | 2 | 1 | 3 | 1 | 1 | 1 | 3 | 1 | 6 | 1 |
| 7 | EVDO | 1 | 1 | | | | | | | | | | | | | 1 | 1 | 3 | 1 | 1 | 1 | 3 | 1 | 6 | 1 |
| 8 | WiFi CS w 11e | 3 | 3 | | | | | | | | | | | | | | | 3 | 3 | 3 | 3 | 3 | 3 | 6 | 3 |
| 9 | WiFi VP w 11e | 1 | 3 | | | | | | | | | | | | | | | | | 1 | 3 | 3 | 3 | 6 | 3 |
| 10 | WiFi V wo 11e | 3 | 3 | | | | | | | | | | | | | | | | | | | 3 | 3 | 6 | 3 |
| 11 | WiFi MESH | 6 | 3 | | | | | | | | | | | | | | | | | | | | | 6 | 3 |

600

*800*
| PARAMETER | VALUE | COMMENTS |
|---|---|---|
| Tf | 0.02 | FRAME PERIOD |
| Tm | 0.025 | MOBILE VoIP FRAME PREPROCESSING. INCLUDES PROCESSING OF THE FIRST VoIP FRAME (20 ms FRAME LENGTH) |
| Tw1 | 0.01 | WIRELESS ACCESS DELAY - 1 Hop |
| Tc | 0.01 | CORE NETWORK DELAY |
| pe | 10.00% | PROBABILITY OF FRAME ERROR |
*FIG. 8A*
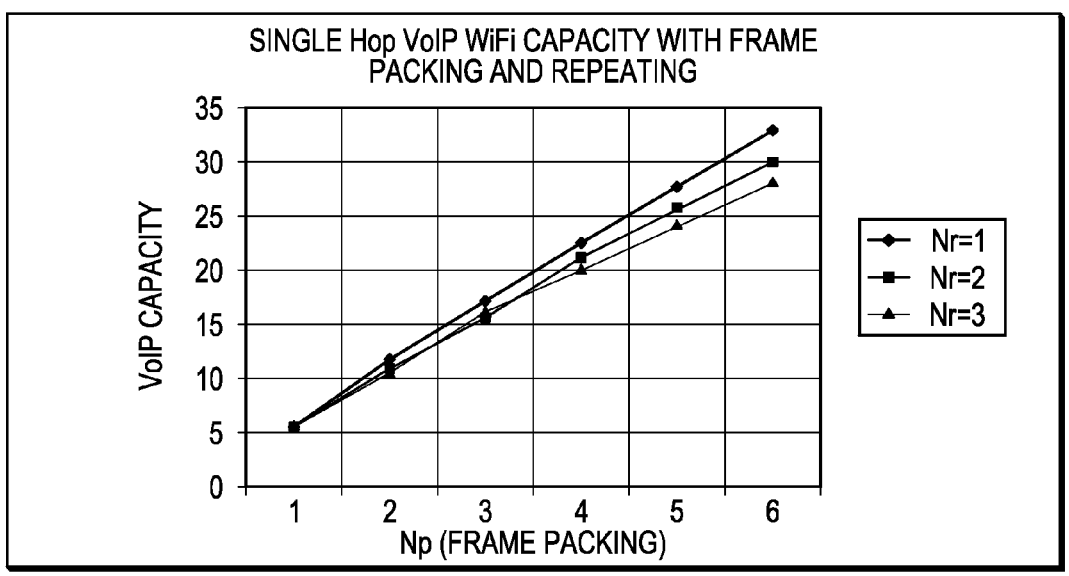
*FIG. 8B*
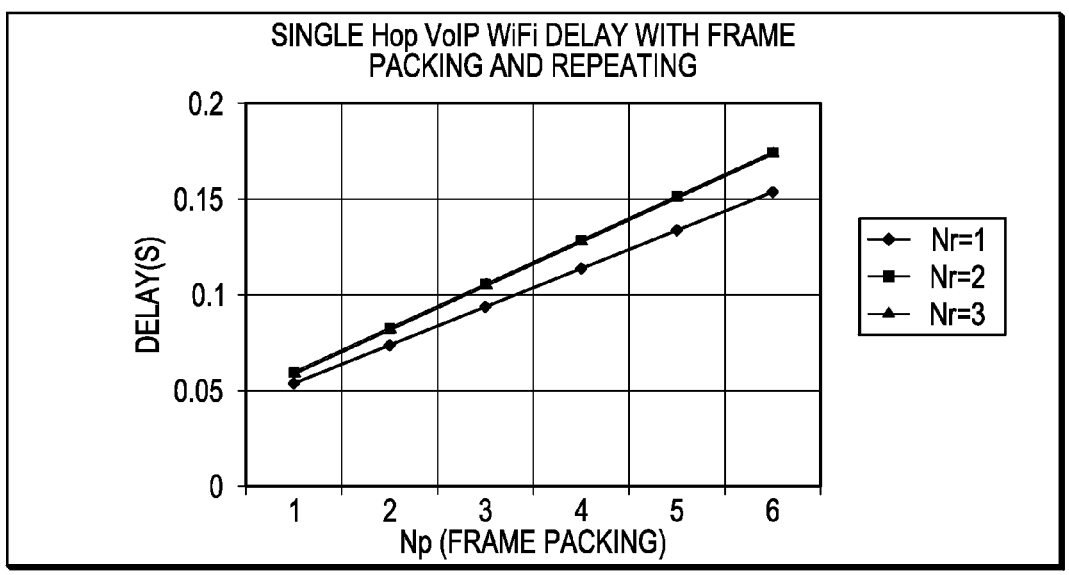
*FIG. 8C*

| PARAMETER | VALUE | COMMENTS |
|---|---|---|
| Tf | 0.02 | FRAME PERIOD |
| Tm | 0.025 | MOBILE VoIP FRAME PREPROCESSING |
| Tc | 0.01 | CORE NETWORK DELAY |
| pe | 10.00% | PROBABILITY OF FRAME ERROR |
| NHop | 3 | NUMBER OF Hops |
| Tw3 | 0.015 | WIRELESS ACCESS DELAY - 3 Hop |
| MULTHop REDUCTION FACTOR | 5 | DUAL-RADIO (ASSUMES bMS AND A AP BACKHUAL, DUAL MAC) |
*FIG. 9A*
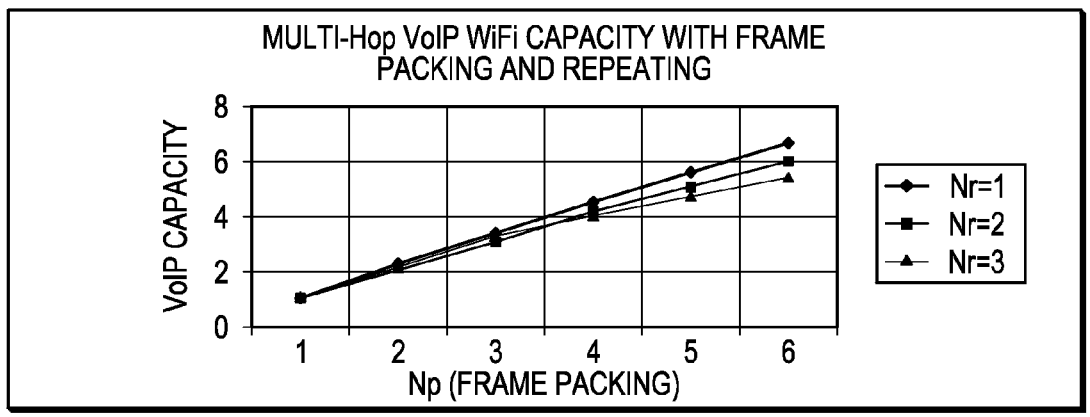
*FIG. 9B*
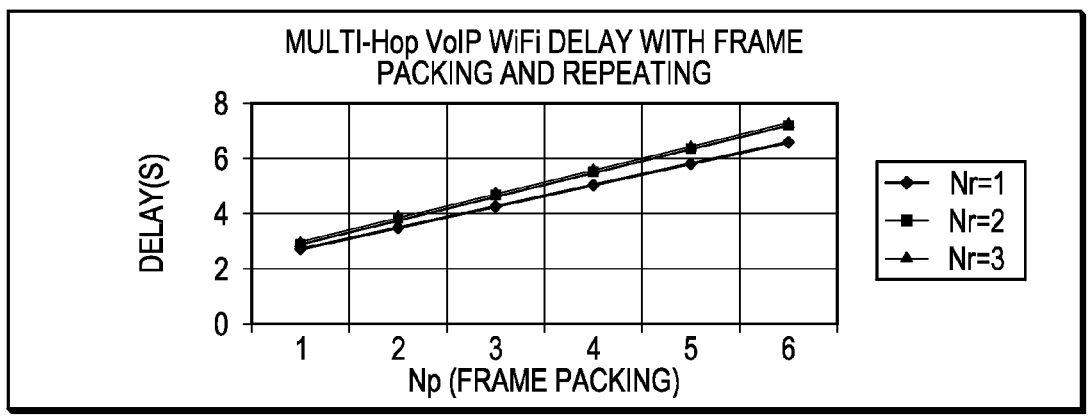
*FIG. 9C*

APPARATUS AND METHOD FOR END-TO-END ADAPTIVE FRAME PACKING AND REDUNDANCY IN A HETEROGENEOUS NETWORK ENVIRONMENT

FIELD OF THE DISCLOSURE

The present disclosure relates generally to packet based wireless communications systems, and more particularly to frame packing and frame redundancy in Voice-Over-Internet-Protocol (VoIP) wireless communications systems.

BACKGROUND

Wireless mobile devices may access wireless networks using a variety of wireless interfaces and may have one of more transceivers adapted to communicate using various wireless interfaces and/or protocols such as, but not limited to, GSM, (including GPRS/EDGE etc.), CDMA, UMTS, CDMA2000, 802.11, 802.16, etc. Increasingly, such mobile devices include a Voice-Over-Internet-Protocol (VoIP) client and therefore are equipped to communicate using VoIP over such heterogeneous wireless networks.

Such various network types may be used for transfer of voice using the Voice-over-Internet-Protocol (VoIP) client of a mobile device, for example, wireless networks employing IEEE 802.11 including IEEE 802.11b. Packetization of voice in such cases however, requires several layers of encapsulation by the various protocols involved. Each protocol has specific requirements, particularly header information, that requires increasing the number of bits transmitted in the overall packet.

For example, a G.729A codec generates 8 Kbits of encoded audio date per second, packaged in 10 byte/10 msec frames. For each frame to be transmitted over an 802.11 link, and further on to the Internet, the frames must be encapsulated into Internet Protocol (IP) packets. To create the IP packets, the data must be encapsulated into a transport protocol packet, which includes a transport header, and the transport protocol packet must be further encapsulated into an IP packet, which includes an IP header.

Thus, at every layer of encapsulation, an additional packet header is added to the payload. A UDP header for example may be 8 bytes in length, an IP header 20 bytes, and an RTP header 12 bytes. In addition, the 802.11b Medium Access Control (MAC) layer adds a header prior to placing the data onto a channel.

Thus, an IP packet carrying only a single G.729A codec frame of 10 bytes of audio data may require up to 40 bytes of protocol header overhead. A second issue for real time voice service is that of delay in retransmission.

For example, automatic repeat request (ARQ) mechanisms typically determine that a data portion is missing based on a timer function. If an expected packet having a given sequence number is not received within the time of a predetermined timeout function, the ARQ mechanism may then request a retransmission. However, such delay time is not acceptable to real time voice calls such as VoIP.

Another issue is created specific to 802.11b by the Carrier Sense Multiple Access-Collision Avoidance (CSMA-CA) mechanism. The mechanism facilitates channel contention prior to each packet transmission. However, time is lost due to the contention period in addition to various MAC messages requiring even more overhead, such as ACK frames required for data acknowledgement, that further contribute to the channel overhead and thus result in inefficient channel utilization. More importantly, contention creates delays in retransmission of data which is unacceptable for real time service such as VoIP.

Therefore, what is needed is an apparatus and method for reducing overhead for voice encapsulation and ideally an apparatus and method for adapting to various radio interfaces and protocols employed in a heterogeneous wireless network environment.

BRIEF DESCRIPTION OF THE DRAWINGS

FIG. 6 is a lookup table for determining initial frame packing and frame repeating parameters in accordance with some embodiments.

FIGS. 8a, 8b and 8c illustrates simulation results of a single hop WiFi network using an embodiment.

FIGS. 9a, 9b and 9c illustrates simulation results of a multi-hop WiFi mesh network using an embodiment.

DETAILED DESCRIPTION

To address the above-mentioned need, an apparatus and method for adaptive frame packing and repeating in a heterogeneous wireless network, that is, a network employing a variety of wireless interfaces/protocols is provided herein.

Figure 1:
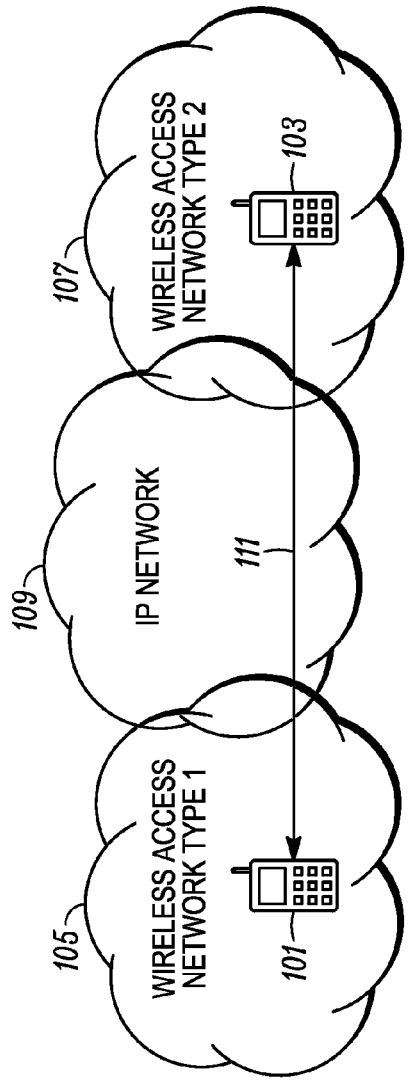
FIG. 1 is a block diagram of a heterogeneous wireless network.

Turning now to the drawings, FIG. 1 illustrates a heterogeneous wireless network 100, that is, a wireless network wherein various wireless access networks provide connectivity over IP Network 109, which may be the Internet. First type wireless access network 105 may enable a first mobile station having a VoIP client, mobile station 101 to communication over a VoIP connection 111 with a second mobile station 103.

The second mobile station 103 also has a VoIP client and communicates over the IP network 109, using a second type wireless access network 107. The wireless access networks 105 and 107 may utilize any wireless interface and/or protocols such as, but not limited to, GSM (using GPRS, EDGE etc.), CDMA, UMTS, CDMA2000, 802.11, 802.16, etc., so as to provide a wireless link for mobile stations such as mobile station 101 and 103 to communicate using VoIP.

Figure 2:
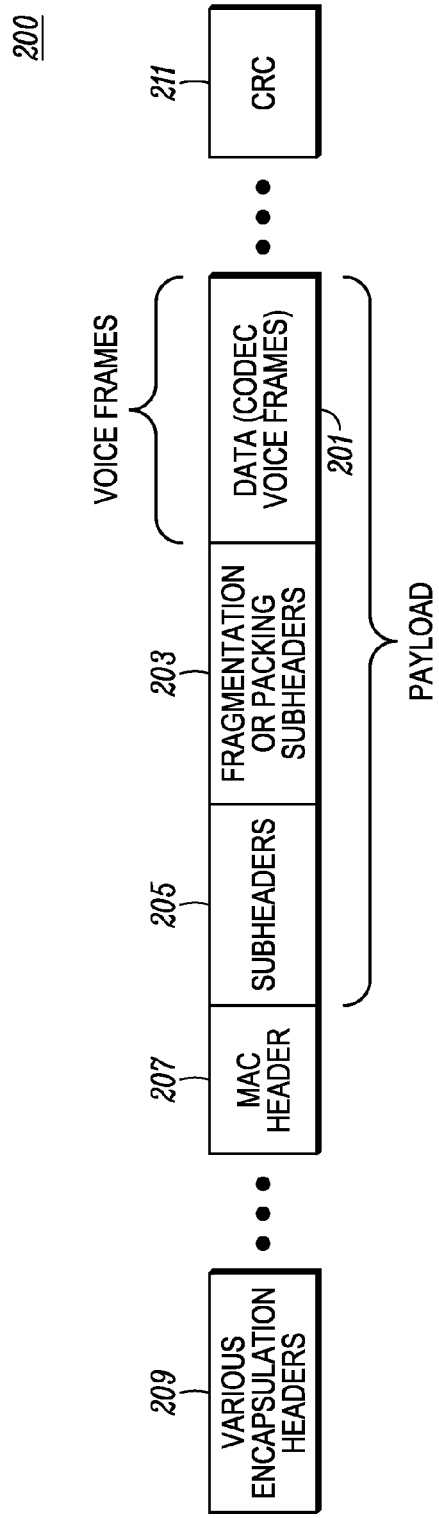
FIG. 2 is a block diagram of a packet having various header information fields.

FIG. 2 illustrates a data packet 200 that may be transferred bi-directionally between mobile station 101 and 103, using the wireless access networks 105 and 107, and the IP Network 109. Packet 200 comprises a data portion 201 which may include voice frames, such as voice frames from various codecs such as, but not limited to, Adaptive Multi-Rate (AMR), EVRC, GSM EFR, G.711, G.723.1, G.726-32, G.729a, or any other codec. Further, packet 200 may have a fragmentation or packing sub-header information field 203, various other sub-headers 205, a MAC header 207, and various other headers 209 which result from encapsulation using various protocols such as, but not limited to, various link protocols such as CDMA RLP, Internet related protocols such as, but not limited to, UDP, RTP, TCP/IP, PPP, etc. Additionally, encapsulation headers 209 and/or subheaders 205 may comprise header information for Session Initiation Protocol (SIP), Session Description Protocol (SDP), etc., used to implement Internet telephony sessions. Packet 200 may also comprise one or more Cyclic Redundancy Check fields 211 for use by various protocols such as the radio link protocols employed by the wireless access networks.

Figure 3:
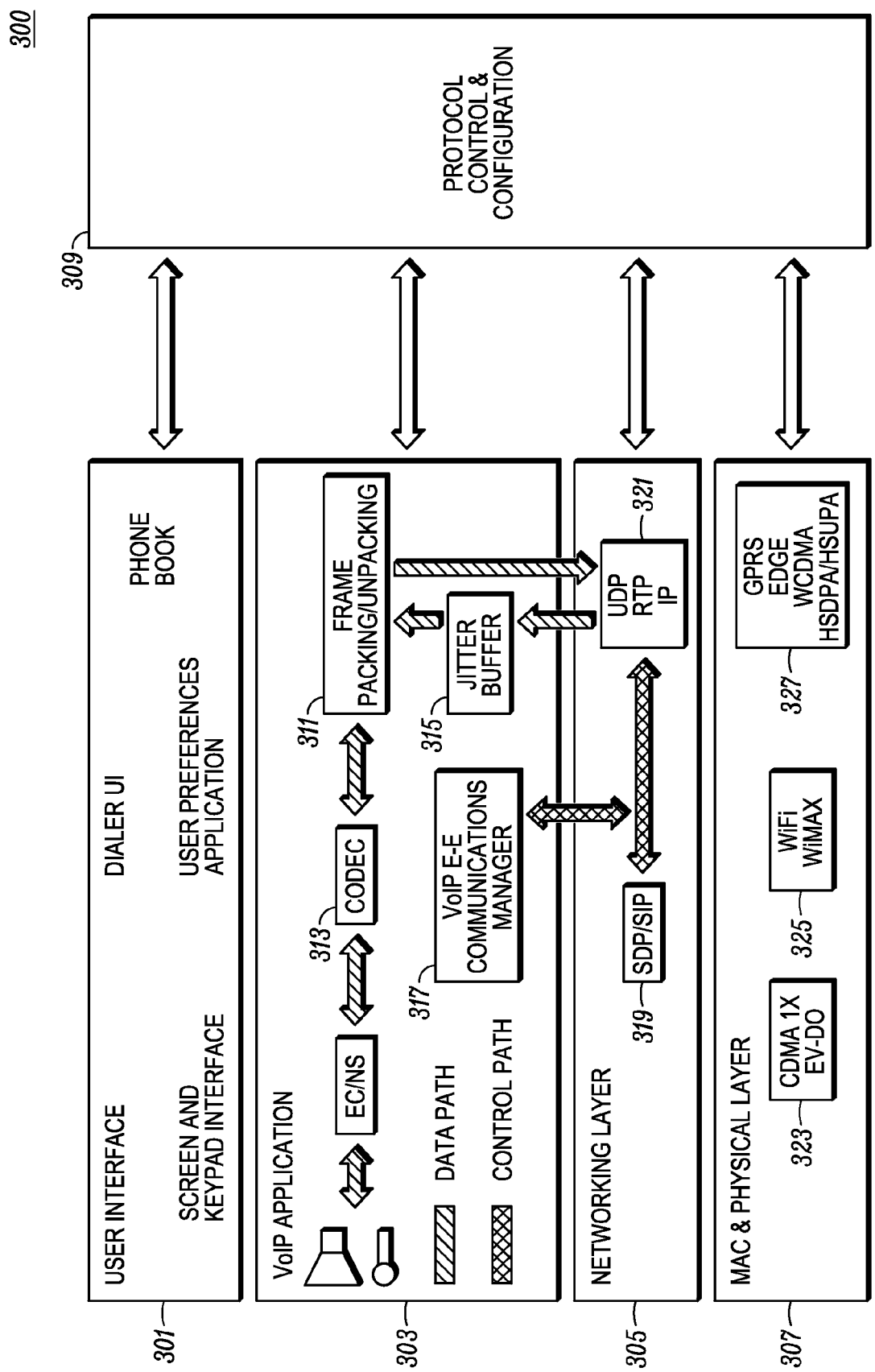
FIG. 3 is a block diagram of a mobile station protocol stack architecture in accordance with the various embodiments.

FIG. 3 provides a simplified block diagram of a mobile station 300 protocol stack architecture in accordance with the various embodiments. It is to be understood that the mobile station 300 comprises processors, transceivers, antennas, and/or any other circuitry and/or hardware, software, or firmware components necessary in order to realize the various components represented by FIG. 3. For example, MAC and Physical layer 307 will have transceivers for communicating over the various wireless interfaces having the appropriate control stacks. Therefore, it is to be understood that FIG. 3 is not intended to be a complete schematic diagram of the components required to implement a mobile station, but rather is exemplary of the components and control stacks required by the various embodiments herein disclosed and is for facilitating understanding of the operation of the various embodiments to those skilled in the art.

Returning to FIG. 3, the mobile station 300 comprises a user interface stack 301 which may include a graphical screen, keypad, dialing user interface, user preferences applications and a phone book. A VoIP application 303 comprises echo cancellation, codec 313, a frame packing/unpacking component 311 in accordance with the various embodiments, a VoIP communication manager 317, and a jitter buffer 315. A networking layer 305 comprises an SDP/SIP 319 component and a UDP/RTP/IP component 321. The MAC and Physical layers 307 which have been combined for simplicity, may comprise one or more wireless interface stacks such as, but not limited to, CDMA-1x EV-DO layer 323, a WiFi/WiMax layer 325 and/or a GPRS, EDGE, WCDMA, HSDPA, HSUPA layer etc. or any appropriate radio interface stack for as was discussed previously. A protocol control and configuration component 309, configures each layer for communication. For example, if the wireless medium used is GPRS/EDGE 327 then the protocol control and configuration component 309 will communicate this to the VoIP application layer 303 so the appropriate frame packing may be applied in accordance with the various embodiments. Alternatively, the user may indicate via preferences that a WiFi (802.11) configuration that best supports concurrent applications such as VoIP and browsing, corresponding to a particular wireless access network be utilized. VoIP application layer 303 has both a data path and a control path.

The VoIP communication manager 317 between two end communications devices engage in peer-to-peer communications in order to first setup the communications path. After the communications path is established, packets containing voice data may be exchanged between the peer mobile stations. The VoIP application layer 303 in general, generates the application data and allows the lower layer, the networking layer 305 and the MAC and Physical layers 307 to package data for transport over the networks. The VoIP application layer 303 of the various embodiments facilitates the adjustment of communications parameters in order to overcome limitations of the underlying networks.

In the various embodiments, a set of parameters is selected for mobile stations communicating using the VoIP application layer 303 for any given wireless technology so as to increase efficiency of peer-to-peer VoIP communications. Thus, in accordance with the various embodiments, the parameters are chosen considering each end network, or wireless access network, and in consideration of the entire communications path, that is, networks and network conditions between each of the end points.

FIG. 4 provides examples of signal flows that may occur in the various embodiments. Two parameters are defined in the embodiments, namely a frame packing parameter "Np" and a frame repeating parameter "Nr." The frame packing parameter Np defines a number of additional audio codec frames to be included in the data portion of a single packet. Because adding additional frames could create an issue for packet loss, because of the additional amount of codec data that would be lost in the case of a packet having more than one audio frame, the various embodiments utilize frame repetition. Thus, Nr defines an appropriate number of previously transmitted audio frames to be repeated in a subsequent frame.

Returning to FIG. 4, examples of Np and Nr setup are depicted in accordance with the various embodiments. A "VAPP" message in FIG. 4 is defined as a VoIP application parameter proposal having the parameters "network type," "Np," and "Nr" as briefly described above. An "ACCEPT" message is defined as a mobile station accepting the proposed call parameters. A "DECLINE" message is defined as a mobile station declining the proposed parameters and the call. Lastly, in FIG. 4 a "PDECLINE" message is defined wherein a mobile station declines the proposed parameters but allows continuation of the call with currently in-use parameters. Therefore, a PDECLINE message may be considered to be declining a proposed update of VoIP application parameters.

Figures 4A, 4B:
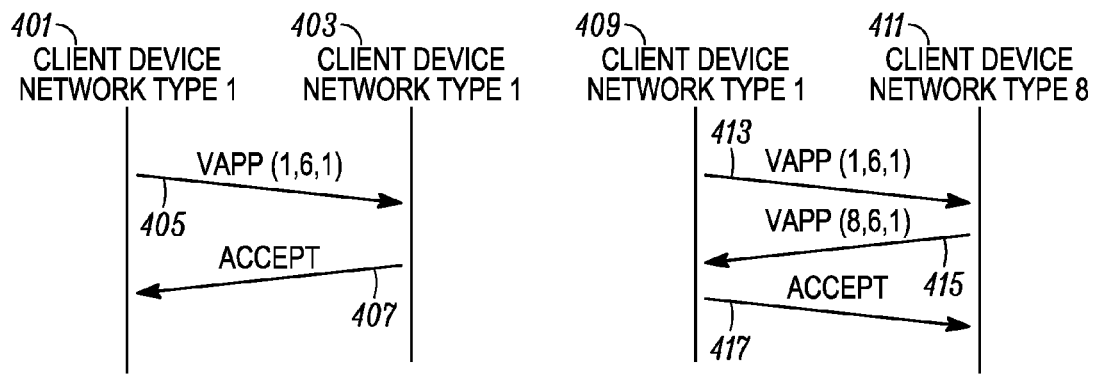
FIG. 4 is a message flow diagram illustrating high level operation of the various embodiments.

Thus in FIG. 4*a* a first client 401 and a second client 403 are both operating on either the same, or identical type networks, specifically a type 1 network. The client device 401 initiate a VAPP message 405 to the called client device 403 proposing network type=1, Np=6, and Nr=1. The called device 403 sends ACCEPT message 407 and the call may proceed using the proposed parameters.

FIG. 4*b* depicts a scenario where a first client device 409 accesses a type 1 network while the called client device 411 accesses a type 8 network. The client device 409 sends a VAPP message proposed network type, Nt=1, Np=6, and Nr=1. Client device 411 may respond with a second VAPP message 415 which proposed Nt=8, Np=6 and Nr=1. This scenario will be described in more detail below. Continuing client device 409 may ACCEPT 417 and the call may proceed.

Figures 4C, 4D:
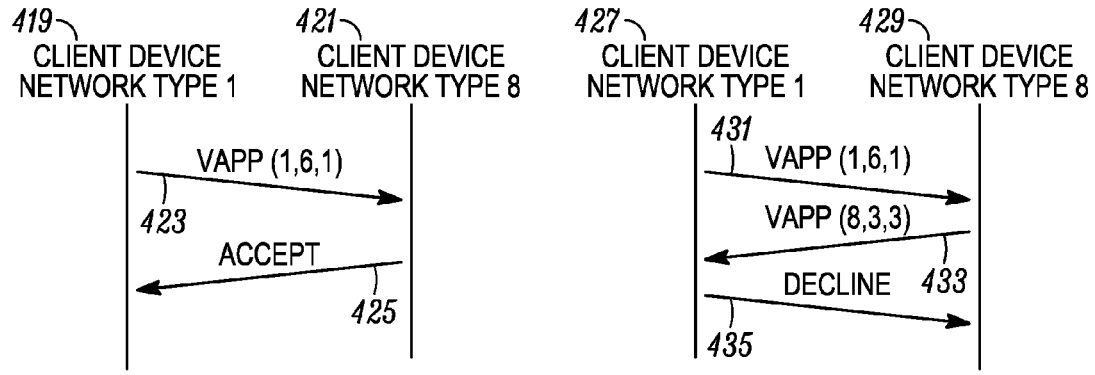

Lastly, in FIG. 4*d*, the client 419 may propose different parameters from its received VAPP message 431 by sending new VAPP message 433. If the parameters are not acceptable to client device 409 it may send a DECLINE message 435 and the call in this scenario will not proceed.

It is to be understood that the signal flows illustrated by FIG. 4 are exemplary for the purposes of facilitating understanding of the various embodiments and do not include all signaling flows that would occur for call setup, for example those messages required by the broader session setup or description protocol such as SDP and/or SIP. Therefore, FIG. 4 is to understood to not be exhaustive of the message flows required, but only to illustrate the message flows required by the various embodiments herein disclosed.

Further, in light of FIG. 4, there are three primary embodiments illustrated thereby, that is, a table lookup approach, which further includes embodiments utilizing fixed values of Np and Nr, and a dynamically adjusted Np and Nr parameter embodiment. In a third embodiment, initial values of Np and Nr may be determined via a lookup table and then dynamically adjusted based upon various existing network conditions.

Figure 5:
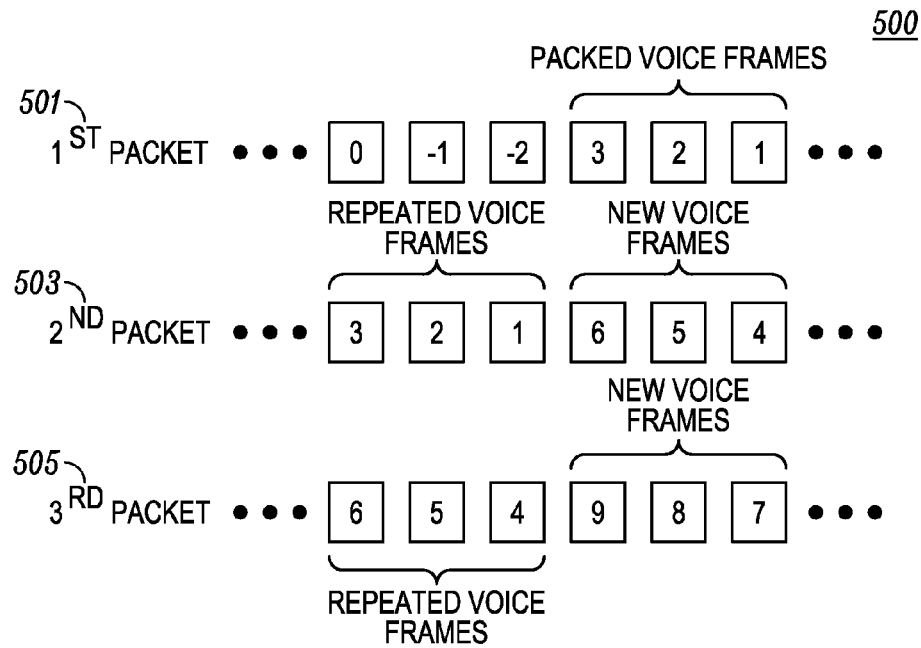
FIG. 5 is a block diagram illustrating frame packing and frame repeating parameters in accordance with the embodiments.

FIG. 5 provides a block diagram for illustrating the Np and Nr VoIP application parameters in accordance with the various embodiments. A scenario 500 assumes that Np=3 and Nr=2. Then given a first packet 501, a second packet will comprise three distinct new audio codec frames, specifically audio codec frames 4, 5 and 6 and three previously transmitted audio codec frames 1, 2, and 3. The audio codec frames 1, 2 and 3 are repeated in the second packet 503 due to the parameter Nr=2. The three new frames 4, 5 and 6 are added to the second packet 503 due to the parameter Np=3, wherein "3" equals the number of new frames added to each new packet. Likewise, third packet 505 has repeated frames 4, 5 and 6 meeting the Nr=2 requirement, and three new audio frames 7, 8, and 9 are added meeting the Np=3 setting.

The frame packing and repeating approach of the various embodiments provides compensation via the VoIP application layer for inefficiencies of the underlying physical and MAC layers wherein specific optimizations for VoIP performance and quality are not provided. FIG. 6 illustrates an embodiment employing a lookup table approach. A priority may be placed upon bandwidth, which is a bottleneck for data in wireless applications and thus a concern for VoIP applications. Thus returning briefly to the example of FIG. 4b in which the calling client device 409 uses a type 1 network and called client device 411 uses a type 8 network, priority may be given to the largest Np and smallest Nr value making bandwidth the priority. Thus a caller of network type 1 (GPRS without header compression) chooses the initial default value by using the row as the calling party and the columns as the called party. A default value may be chosen by assuming initially that both client devices are on a similar type network, thus, the client device may use table 600, row 1, column 1 to determine Np=6 and Nr=1 and send the VAPP message "VAPP (1,6,1)" message 413. The client device 411 may accept, or alternatively, now knowing the calling client's 409 network type may use the table 600 caller row 1, called party column 8 to propose different parameters. In the scenario illustrated by table 600 the default values remain (8,6,1) with only the network type being different, that is, Nt=8. Therefore, client device 409 may accept the Np=6 and Nr=1 parameters.

Figure 7:
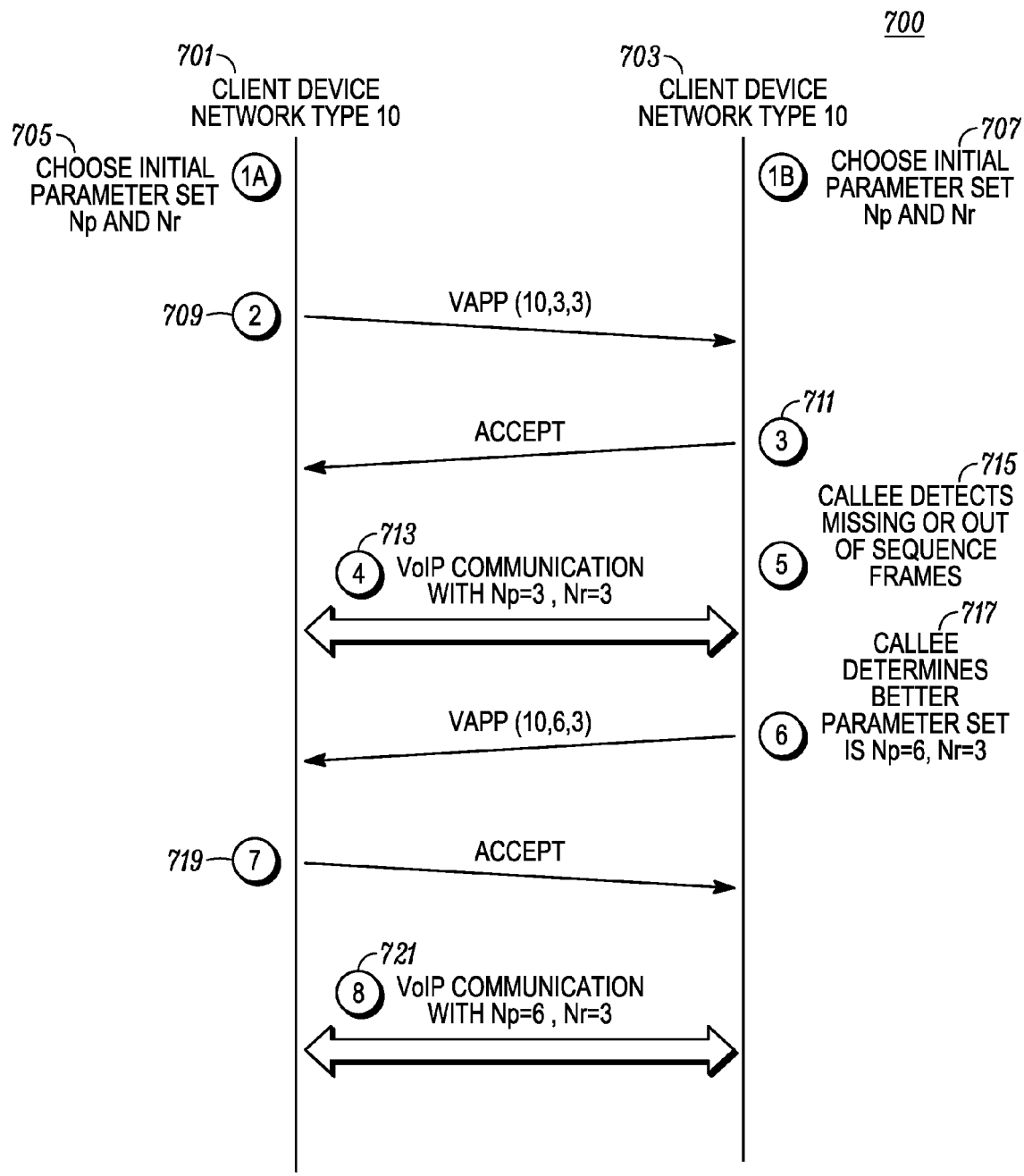
FIG. 7 is a message flow diagram illustrating dynamic adjustment of frame packing and frame repeating parameters in accordance with an embodiment.

In some embodiments as mentioned above, the Np and Nr parameters may remain fixed for the duration of the VoIP call. However, also as mentioned above, the Np and Nr parameters may be dynamically adjusted based upon subsequent updated information such as, but not limited to, data regarding network conditions. Therefore in FIG. 7, an embodiment employing dynamic adjustment is illustrated. In FIG. 7 a first mobile station client 701 uses network type 10 and second client device 703 also used network type 10. In step 1a 705, the client 701 checks default parameters and also measures the communications channel for example contention, path loss or any other appropriate network related measurement that indicate delay and/or channel quality and selects Np=3 and Nr=3. The client device 703 performs a similar action 1b 707. Client 701 may initiate a VAPP message 709 with Nt=10, Np=3 and Nr=3. The client 703 may send ACCEPT message 711. A VoIP communication 713 may then proceed using the proposed and accepted parameters.

However, the client 703 may, as part of periodic quality measurements made by cline 703 as well as by client 701, detect missing or out of sequence frames. Such measurements may be direct measurement of the radio channel or detection of lost or out of sequence frames, or combinations thereof.

The client 703 may then determine that a better parameter set is Np=6 and Nr=3 and propose these parameters to client 705 using VAPP message 717. Client 701 may ACCEPT 719 and the VoIP communication 721 may proceed using the adjusted parameters. Alternatively, the client 701 may have sent a PDECLINE message declining the new parameters but continuing the call using the previously accepted parameter set Np=3 and Nr=3.

Additionally, the Path Maximum Transfer Unit (PMTU), which is the upper limit a network may impose on the size of a packet that it may transport, may be discovered and used to assist in selecting Np and Nr values.

Thus for example, a multi-hop path requiring three hops link L1, L2 and L3, Let PMTU(L1)>PMTU (L2)>PMTU (L3). Assuming a packet of size=PMTU(L1) is transmitted then this packet will be defragmented as PMTU(L2)<PMTU (L1). Effectively the packet will be fragmented at the destination. Because there is a delay cost associated with defragmentation and fragmentation, the delay cost may override the benefits of packing and repeating. Therefore, discovering the PMTU is helpful for deciding the maximum size of the packet that can be sent from a given source to a given destination without incurring delay cost associated with fragmentation. When the destination changes, PMTU discovery can be done for new destination path and accordingly Np and Nr can be set.

FIGS. 8a, 8b and 8c provide simulation data illustrating the implications of frame packing, varying from Np=1 to Np=6, and repeating for a WiFi 802.11e network having a 10% packet error rate and a single hop access point in accordance with an embodiment. Table 800 of FIG. 8a provides additional assumptions made for the simulations including frame period Tf, frame processing Tm, wireless access delay Tw1, core network delay Tc, and packet error rate pe as mentioned. FIG. 8b shows that varying Nr from 1 to 3 has minor impact on VoIP capacity. This is because once successful channel contention has been achieved then sending additional information, that is, redundant frames, has only a minor effect on data throughput. This will remain the case until the packet size exceeds the maximum which by default is 1500 bytes.

FIG. 8b illustrates increases in the average delay. However, with contention rates below approximately 50% acceptable delay of less than 1 ms over the WiFi link should be achievable with the various embodiments. While the average 1-way mouth to ear delay per ITU recommendations for good voice quality is 270 ms, VoIP applications have been shown to deliver acceptable voice quality with up to 2 sec of delay. It is to be noted that delay does not increase appreciably for Nr=1, 2 or 3. In contrast to ARQ schemes which retransmit only when there is an error the packet repeat mechanism of the various embodiments provides redundancy with insignificant delay penalty. This is because the packet repeat mechanism of the various embodiments takes advantage of unused, and thus essentially wasted, capacity. There is little penalty for sending redundant bits once contention is successful For comparison, FIGS. 9a, 9b and 9c show simulation results for a WiFi Mesh system with 3 hops.

Figure 10:
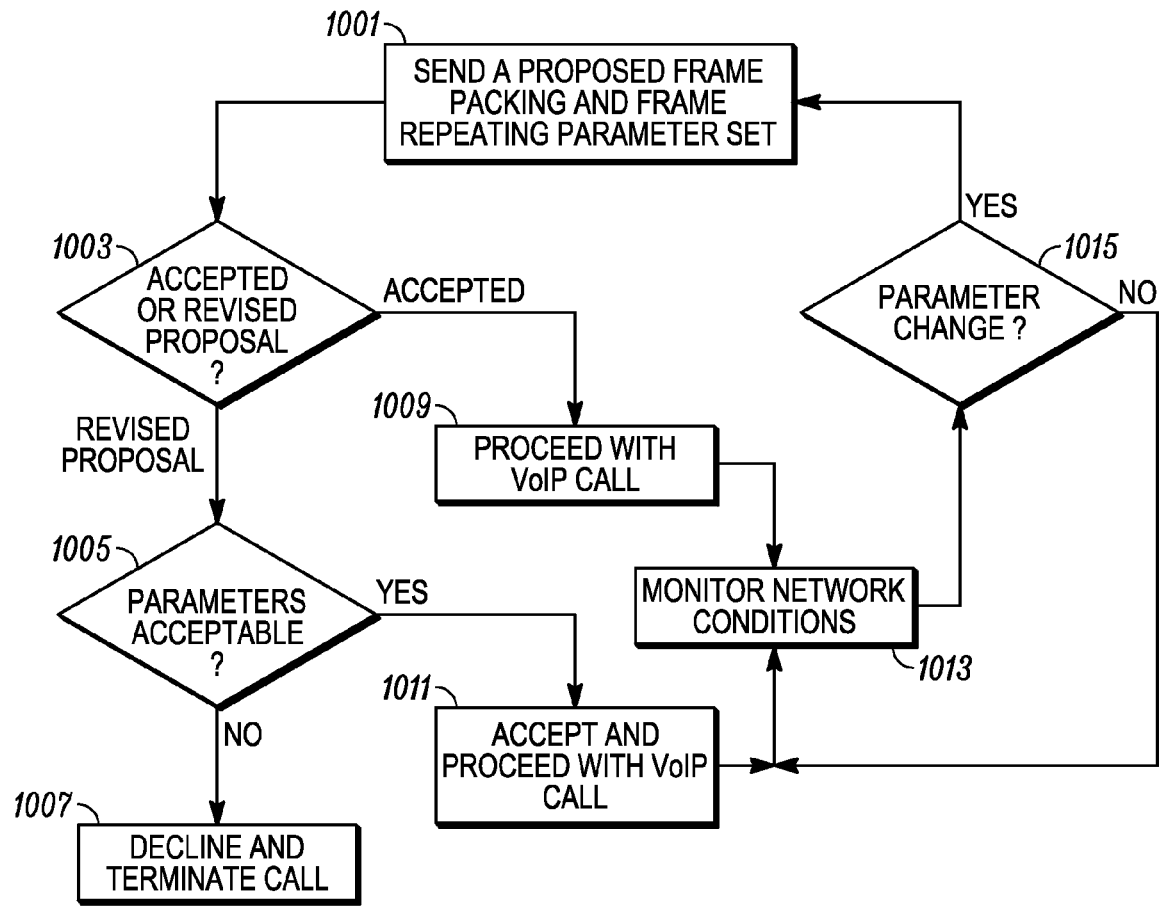
FIG. 10 is a flow chart summarizing operation of mobile stations with VoIP clients in accordance with the various embodiments.

FIG. 10 summarizes the overall operation of the various embodiments for a mobile station having a VoIP client. In 1001 the client may send a proposed frame packing and frame repeating parameter set as part of an overall session setup protocol. In 1003 the client may receive either an accept message or a revised proposal. The proposal may also be declined (not shown) in which case the call is simply terminated. If accepted the VoIP call is established in 1009. The calling client and also the called client will monitor the network conditions in 1013 such as, but not limited to contention period, network delay, PMTU, etc. and if the conditions warrant determine that there is a better parameter set in 1015. If yes then the process returns to 1001 and proposes a new parameter set. If not, network monitoring continues as in 1013.

Returning to 1003 a revised proposal may be received in which case the client must determine if the new proposed parameters are acceptable in 1005. If yes, the VoIP call may be accepted in 1011 and the clients go on once again to monitor the network as in 1013 and 1015. If the new parameters are not acceptable then the client may decline as in 1007 and the call is terminated thus ending the process.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

The invention claimed is:

1. A method of operating a Voice-over-Internet-Protocol (VoIP) client device, the method comprising:
   determining, using one or more processors, a frame packing factor representing a number of encoded audio frames to be encapsulated into a data portion of a single Internet Protocol (IP) packet and a frame repetition factor representing a number of times said encoded audio frames are to be resent, the determining including performing a table lookup of an initial frame packing factor and an initial frame repetition factor based on a first radio access network radio interface;
   sending, to a second VoIP client device, a message comprising a network type indicator corresponding to a first wireless interface, said frame packing factor, and said frame repetition factor;
   receiving, using the one or more processors, an accept message from said second VoIP client device accepting said frame packing factor and said frame repetition factor; and
   initiating a VoIP call, the VoIP call being arranged based on a communication agreement with the second VoIP client device to exchange IP packets by using said frame packing factor to determine the number of audio frames to include in the data portion of each packet, and by using said frame repetition factor to determine how many times to repeat said audio frames in subsequent packets;
   monitoring, using the one or more processors, network conditions including at least one of packet delay, contention delay, path loss, or a Path Maximum Transfer Unit (PMTU);
   determining, using the one or more processors, a revised frame packing factor and a revised frame repetition factor based upon said network conditions;
   sending, using the one or more processors, a message comprising said revised frame packing factor and said revised frame repetition factor; and
   establishing, using the one or more processors, said VoIP call using at least said frame packing factor and frame repetition factor or said revised frame packing factor and said revised frame repetition factor.

2. The method of claim 1, further comprising:
   receiving an accept message from said second VoIP client device accepting said revised frame packing factor and said revised frame repetition factor; and
   continuing said VoIP call using said revised frame packing factor and said revised frame repetition factor.

3. The method of claim 1, further comprising:
   receiving a decline message from said second VoIP client device declining said revised frame packing factor and said revised frame repetition factor; and
   continuing said VoIP call using a previous frame packing factor and a previous frame repetition factor.

4. An apparatus for operating a Voice-over-Internet-Protocol (VoIP) client device, the apparatus comprising:
   a memory storing encoded audio frames; and
   one or more processors coupled to the memory, the one or more processors being configured to:
   determine a frame packing factor representing a number of encoded audio frames from memory to be encapsulated into a data portion of a single Internet Protocol (IP) packet and a frame repetition factor representing a number of times said encoded audio frames are to be resent, the determining includes performing a table lookup of an initial frame packing factor and an initial frame repetition factor based on a first radio access network radio interface;
   send, to a second VoIP client device, a message comprising a network type indicator corresponding to a first wireless interface, said frame packing factor, and said frame repetition factor;
   receive an accept message from said second VoIP client device accepting said frame packing factor and said frame repetition factor; and
   initiate a VoIP call, the VoIP call being arranged based on a communication agreement with the second VoIP client device to exchange IP packets by using said frame packing factor to determine the number of audio frames to include in the data portion of each packet, and by using said frame repetition factor to determine how many times to repeat said audio frames in subsequent packets;
   monitor network conditions including at least one of packet delay, contention delay, path loss, or a Path Maximum Transfer Unit (PMTU);
   determine a revised frame packing factor and a revised frame repetition factor based upon said network conditions;
   send a message comprising said revised frame packing factor and said revised frame repetition factor; and
   establish said VoIP call using at least said frame packing factor and frame repetition factor or said revised frame packing factor and said revised frame repetition factor.

5. The apparatus of claim 4, wherein the one or more processors are further configured to:
   receive an accept message from said second VoIP client device accepting said revised frame packing factor and said revised frame repetition factor; and
   continue said VoIP call using said revised frame packing factor and said revised frame repetition factor.

6. The apparatus of claim 4, wherein the one or more processors are further configured to:
   receive a decline message from said second VoIP client device declining said revised frame packing factor and said revised frame repetition factor; and
   continue said VoIP call using a previous frame packing factor and a previous frame repetition factor.

* * * * *